US012644588B2

(12) United States Patent
Loomis

(10) Patent No.: US 12,644,588 B2
(45) Date of Patent: Jun. 2, 2026

(54) LIGHTING ELEMENT ADAPTOR

(71) Applicant: Seasons 4, Inc., Toano, VA (US)

(72) Inventor: Jason Loomis, Decatur, GA (US)

(73) Assignee: Seasons 4, Inc., Toano, VA (US)

( * ) Notice: Subject to any disclaimer, the term of this patent is extended or adjusted under 35 U.S.C. 154(b) by 0 days.

(21) Appl. No.: 19/222,341

(22) Filed: May 29, 2025

(65) Prior Publication Data

US 2026/0022828 A1 Jan. 22, 2026

Related U.S. Application Data

(63) Continuation-in-part of application No. 18/779,685, filed on Jul. 22, 2024, now Pat. No. 12,338,985.

(51) Int. Cl.

*F21V 23/06* (2006.01)
*F21V 19/00* (2006.01)
*F21V 23/00* (2015.01)
*F21V 23/04* (2006.01)
*F21V 33/00* (2006.01)
*F21Y 115/10* (2016.01)

(52) U.S. Cl.

CPC ............ *F21V 23/06* (2013.01); *F21V 19/006* (2013.01); *F21V 23/003* (2013.01); *F21V 23/0435* (2013.01); *F21V 33/0056* (2013.01); *F21Y 2115/10* (2016.08)

(58) Field of Classification Search

CPC .... F21V 19/006; F21V 19/0065; F21V 23/06; H01R 33/9453

See application file for complete search history.

(56) References Cited

U.S. PATENT DOCUMENTS 2,221,505 A 11/1940 Benander
4,654,541 A * 3/1987 Angott ................. H01R 33/945 200/61.03

(Continued)

FOREIGN PATENT DOCUMENTS

KR 20240070885 A * 5/2024 ......... H01R 13/5202
WO 2005001333 A2 1/2005

OTHER PUBLICATIONS

International Search Report and Written Opinion for International Patent Application No. PCT/US2025/038524, mailed Oct. 28, 2025, 13 pages.

*Primary Examiner* — Alexander K Garlen
(74) *Attorney, Agent, or Firm* — Kinney & Lange, P.A.

(57) ABSTRACT

Apparatus and associated methods relate lighting element adaptor that has a male and a female connector axially aligned with one another along an axis of a body so as to be interposed between a lighting element and a lighting socket. The male connector is configured to engage the lighting socket so as to receive AC power provided therefrom. The female connector is complementary to the male connector. The female connector is conductively coupled with the male connector so as to receive AC power therefrom. The female connector is configured to receive the lighting element and to provide the AC power received from the male connector thereto. A rain guard projects radially outward from the body between the complementary male and female AC-power connectors. The rain guard has a peripheral drip edge that circumscribes an interior the female AC-power connector, thereby providing rain protection thereto.

28 Claims, 13 Drawing Sheets

(56) References Cited

U.S. PATENT DOCUMENTS

| | | | | |
|---|---|---|---|---|
| 5,121,287 | A * | 6/1992 | Lee | H01R 33/9453 361/600 |
| 7,844,060 | B2 | 11/2010 | Zulkowski | |
| 8,042,961 | B2 | 10/2011 | Massara et al. | |
| 8,872,417 | B2 | 10/2014 | Fatt et al. | |
| 9,265,119 | B2 | 2/2016 | Catalano et al. | |
| 10,264,170 | B2 | 4/2019 | Chien | |
| 11,073,261 | B1 | 7/2021 | Huang | |
| 2006/0012980 | A1 * | 1/2006 | Mize | F21V 21/32 362/198 |
| 2006/0033454 | A1 * | 2/2006 | Mathews | H05B 47/185 315/294 |
| 2006/0039570 | A1 | 2/2006 | Yeh | |
| 2007/0110266 | A1 | 5/2007 | Zulkowski | |
| 2009/0260504 | A1 | 10/2009 | Chen | |
| 2010/0330843 | A1 | 12/2010 | Gao et al. | |
| 2012/0120243 | A1 | 5/2012 | Chien | |
| 2013/0308315 | A1 | 11/2013 | Capitani et al. | |
| 2014/0268697 | A1 * | 9/2014 | Smith | H05B 47/1965 362/183 |
| 2014/0285999 | A1 | 9/2014 | Luna et al. | |
| 2015/0109784 | A1 | 4/2015 | Baschnagel | |
| 2015/0159825 | A1 * | 6/2015 | Flynn | H01R 33/9453 362/183 |
| 2016/0215933 | A1 | 7/2016 | Skelton et al. | |
| 2018/0145446 | A1 * | 5/2018 | Archuleta | H01R 33/94 |
| 2023/0086995 | A1 | 3/2023 | Zhang et al. | |
| 2023/0155335 | A1 | 5/2023 | Stewart et al. | |

* cited by examiner

LIGHTING ELEMENT ADAPTOR

BACKGROUND

Various venues where people gather provide music for ambiance so as to attract patrons and guests thereto. For example, various outdoor venues can be used for dining, for listening to invited speakers, for concerts, etc. Many such venues will provide lighting for guests attending such events. Some such outdoor lighting systems can be permanently constructed or temporarily constructed. One such form of outdoor lighting uses café lighting strings. Café light strings are strings of lights configured to provide lighting over an open expanse, such as, for example, a grassy lawn or a patio. These café lights are usually configured as strings of lights suspended over the open expanse between securing structures.

SUMMARY

Some embodiments relate to a lighting element adaptor that includes complementary male and female AC-power connectors axially aligned with one another. Such a configuration permits the lighting element adaptor to be interposed between a lighting element and a lighting socket. The male AC-power connector is configured to engage a lighting socket so as to receive AC power therefrom. The female AC-power connector is conductively coupled with the male AC-power connector so as to receive AC power therefrom. The female AC-power connector is configured to receive a lighting element and to provide the AC power received from the male AC-power connector thereto. The lighting element adaptor also includes am AC/DC power converter configured to generate DC power from the AC power received by the male AC-power connector and to provide the DC power generated to a DC-powered device coupled thereto.

Some embodiments relate to a lamp fixture having an AC-power connector configured to engage an AC outlet so as to receive AC power provided therefrom. The lamp fixture includes an AC/DC power converter configured to generate DC power from the AC power received by the AC-power connector. The lamp fixture includes a DC-power connector configured to provide the DC power generated by the AC/DC converter to an illuminating lamp shade. The lamp fixture includes an illuminating lamp shade having a plurality of LEDs that are configured to generate an illumination pattern thereon in response to DC power provided thereto via the DC-power connector. The lamp fixture also includes a lighting-element connector conductively coupled with the AC-power connector so as to receive AC power therefrom, the lighting-element connector configured to receive a lighting element and to provide the AC power received from the AC-power connector thereto.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Apparatus and associated methods relate lighting element adaptor that has a male and a female connector axially aligned with one another along an axis of a body so as to be interposed between a lighting element and a lighting socket. The male connector is configured to engage the lighting socket so as to receive AC power provided therefrom. The female connector is complementary to the male connector. The female connector is conductively coupled with the male connector so as to receive AC power therefrom. The female connector is configured to receive the lighting element and to provide the AC power received from the male connector thereto. A rain guard projects radially outward from the body between the complementary male and female AC-power connectors. The rain guard has a peripheral drip edge that circumscribes an interior the female AC-power connector, thereby providing rain protection thereto.

Figure 1:
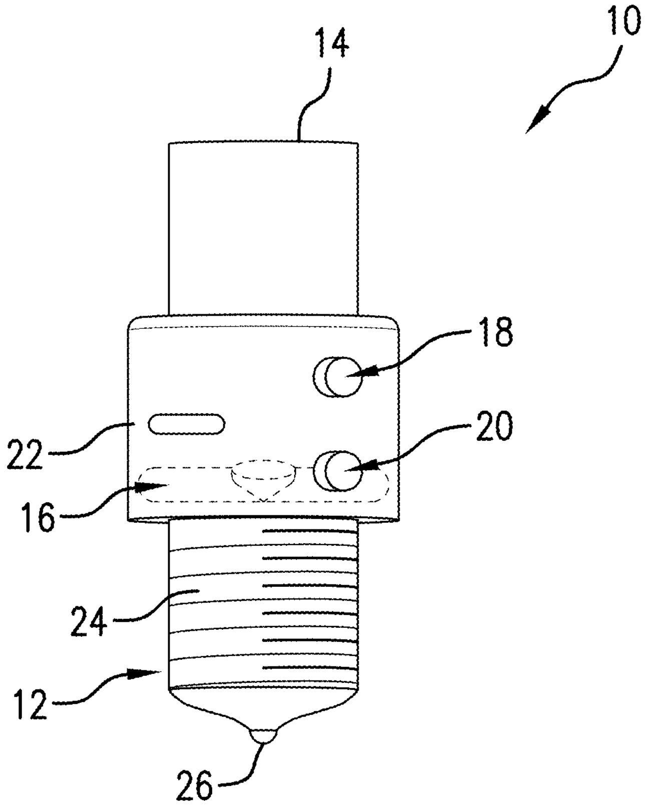
FIG. 1 is a side elevation view of a light element adaptor.

FIG. 1 is a side elevation view of a light element adaptor. In FIG. 1, light element adaptor 10 has male AC-power connector 12, female AC-power connector 14, AC/DC power converter 16, AC power switch 18, DC power switch 20 and DC-power connector 22, which in the depicted embodiment is a USB-C type of power connector. Various other industry standard low-voltage connectors could be used for providing DC-power to connected devices. Such other low-voltage connectors include, for example, USB-A, USB-B, USB-C, Micro-USB, Mini-USB, Lightning Connectors (e.g., proprietary connectors used by Apple™ for iPhones™, iPads™, and other Apple™ devices), Barrel Connectors (i.e., round connectors commonly used for DC power input on laptops and other devices), etc.

In the depicted embodiment, male and female AC-power connectors 12 and 14 are complementary to one another. Such complementarity of male and female AC-power connectors enables light element adaptor 10 to be interposed between a lighting element and a lighting socket configured to receive the lighting element. For example, the lighting element can be removed from the lighting socket by removing a male AC-power connector of the lighting element from the lighting socket. Male AC-power connector 12 of lighting element adaptor 10, being made according to the same standard as the male AC-power connector of the lighting element, can then be inserted into the lighting socket. Female AC-power connector 14 of lighting element adaptor 10, being made according to the same standard as the female AC-power connector of the lighting socket, can then receive the male AC-power connector of the lighting element therein.

Male and female AC-power connectors 12 and 14 are conductively coupled to one another, such that female AC-power connector 14 provides AC power received by male AC-power connector 12 to the lighting element connected to female AC-power connector 14. In the depicted embodiment, AC power is selectively provided to female AC-power connector 14 via AC-power switch 18. In other embodiments, female AC-power connector 14 and male AC-power connector 12 are hardwire connected to one another. In such a hardwired configuration, the lighting element is provided AC power regardless of whether the lighting element is directly connected or indirectly connected, via light element adaptor 10, to the lighting socket. Moreover, male and female AC-power connectors 12 and 14 are axially aligned with one another along common axis A, as depicted in FIG. 1. Such alignment ensures that the lighting element is located along axis A, regardless of whether the lighting element is directly connected or indirectly connected, via light element adaptor 10, to the lighting socket. Even if lighting element adaptor 10 is interposed between the lighting element and its lighting socket, the lighting element will remain aligned with axis A, although the lighting element will reside further from the lighting socket. Thus, as long as space exists along axis A, lighting element adaptor 10 can be interposed between the lighting element and its lighting socket.

Lighting element adaptor 10 is configured to be modestly sized, so as to minimize the difference between locations where the lighting element resides when it is directly connected to a lighting socket and where the lighting element resides when indirectly connected to the lighting socket via lighting element adapter 10. To reduce this difference between such locations, lighting element adapter is configured with proximity between male and female AC-power connectors 12 and 14. Various metrics of such proximities can be used to characterize such location difference. For example, this difference in locations can be measured as a ratio between a first axially dimension as measured between a top of female AC-power connector 14 to a bottom center of female AC-power connector 14 (e.g., to the hot contact located at the bottom of female E-type connectors) and a second axial dimension as measured between the top of female AC-power connector 14 to a bottom center (e.g., to the hot contact located at the bottom of male E-type connectors) of male AC-power connector 12. This is a ratio of the axial dimension of the contacting elements of the lighting contact and the height of lighting element adaptor 10. Such a ratio can be greater than 25%, 33%, 40%, for example. In a limiting embodiment, such a ratio could nearly approach 50% as female AC-power connector 14 is located immediately adjacent (i.e., immediately above or below) male AC-power connector 12.

Another metric of such a location difference could be, for example, a ratio between a third dimension as measured between a top of the female AC-power connector 14 to a bottom of female AC-power connector 14 (i.e., the actual axial dimension of the contacting elements of the lighting contact) and a fourth dimension as measured between the bottom of female AC-power connector 14 to the bottom of male AC-power connector 12 (i.e., the actual lighting element displacement by lighting element adaptor 10). This is a ratio of the axial dimension of the contacting elements of the lighting contact and the actual lighting element displacement caused by interposing lighting element adaptor 10. Such a ratio can be greater than 50%, 67%, 75%, 90% for example. In a limiting embodiment, such a ratio could nearly approach 100% as female AC-power connector 14 is located immediately adjacent (i.e., immediately above or below) male AC-power connector 12.

In the depicted embodiment, male and female AC-power connectors 12 and 14 are E-type lighting connectors, such as, for example, E12, E17, E26 and E27 sized lighting connectors. Female AC-power connector 14 is configured to receive a male E-type lighting connector, such as are commonly used for many types of lighting elements. Male AC-power connector 12 is configured to engage an E-type lighting socket so as to receive AC operating power therefrom. Such E-type lighting connectors provide power connector via threaded substantially-cylindrical male and female counterparts. Male AC-power connector 12 includes insulating region 22 providing electrical isolation between neutral contact 24 and hot contact 26. Hot contact 26 is located at a central end portion of male AC-power connector 12 along axis A. Hot contact 26 is located at a base of the substantially-cylindrical male AC-power connector 10. The sidewalls (e.g., substantially-cylindrical exterior surface) of male AC-power connecter are conductive and threaded. The conductivity of these sidewalls facilitates electrical connection with sidewalls (e.g., substantially-cylindrical interior surface) of a complementary female AC-power connector of a lighting socket. The threading of the sidewalls of male AC-power connector facilitates mechanical engagement with threading of the complementary female AC-power connector of a lighting socket. Although E-type lighting connectors are depicted in the FIG. 1 embodiment, various other types of complementary lighting connectors, as are used in the art, can be used for complementary AC-power connectors 12 and 14.

AC/DC power converter 16 is conductively coupled to male AC-power connector 12 so as to receive AC power therefrom. AC/DC power converter 16 is configured to generate DC power from the AC power received. Such DC power can then be provided to any of a variety of DC-powered devices that are often used in lighted venues, such as, for example, Bluetooth speakers. AC/DC power converter 16 can provide the DC power generated to a DC-powered device connected thereto via DC-power connector 22. In the depicted embodiment, DC power is selectively provided to DC-power connector 22 via DC-power switch 20. In other embodiments, the DC power generated is continually provided to DC-power connector 22, without selective interruption by a DC power switch.

FIGS. 2A-2D are perspective views of various embodiments of a light element adaptor. In FIGS. 2A-2D, lighting element adaptors 10*a*, 10*b*, and 10*c* are depicted. Each of lighting element adaptors 10*a*, 10*b* and 10*c* include male AC-power connector 12, female AC-power connector 14, AC/DC power converter 16 (enclosed within lighting element adaptors 10*a*-10*c*), and annular recess 28, which can be configured to engage with an attachment, such as, for example, a wire frame of a lamp shade and/or an audio speaker. Each of lighting element adapters 10*a*-10*c* differ from one another in the manner in which DC power is provided to DC-powered devices connected thereto. Lighting element adaptor 10*a* has DC-power connector 22*a*, which is a USB type of DC power connector. Lighting element adaptor 10*b* has DC-power connector 22*b*, which is located within annular recess 28 of lighting element adaptor 10*b*. Such a configuration can be used to provide DC power to an LED illuminated rain guard or lamp shade, for example. Lighting element 10*c* has DC-power connector 22*c*, which is located in or on a peripheral surface of body portion 30 surrounding female AC-power connector 14. Lighting element 10*c* also has AC power switch 18 and DC power switch 20 for enabling user selection of both AC power to female AC-power connector 14 and DC power to DC-power connector 22*c*.

In some embodiments, light element adaptors 10*a*, 10*b*, and/or 10*c* can include a receiver and a con for receiving signals that configure light element adaptor 10*a*, 10*b*, and/or 10*c* in some manner. For example, light element adaptors 10*a*, 10*b* and/or 10*c* can include such a receiver for receiving signals: i) that command the lighting element adaptors 10*a*, 10*b*, and/or 10*c* to selectively provide AC power to female AC-power connector; ii) that command the lighting element adaptors 10*a*, 10*b*, and/or 10*c* to selectively provides the DC power generated to DC-power connectors 22*a*, 22*b*, and/or 22*c*; iii) that command the lighting element adaptors 10*a*, 10*b*, and/or 10*c* to control the voltage of power provided to DC-power connectors 22*a*, 22*b*, and/or 22*c*; and/or iv) containing audio that is provided to a speaker connected to light element adaptor 10*a*, 10*b*, and/or 10*c*. Similarly, in some embodiments the receiver can be configured to receive commands, for example, that selectively provide to female AC-power connector 14 the AC power received by male AC-power connector 12. The receiver can be either one that receives signals using an industry standard protocol, or one that receives signals using a proprietary protocol. Such communicated signals can be: i) signals multiplexed on the AC power received by male AC-power connector 12; ii) optical signals; or iii) electromagnetic waves of other frequencies. Some industry standard protocols for electromagnetic waves include, for example, Bluetooth (e.g., Bluetooth Classic, Bluetooth Low Energy, Bluetooth 5.x, etc.) Wi-Fi (e.g., standards include 802.11a/b/g/n/ac/ax), RF, NFC, IR, Zigbee (e.g., standards include 802.15.4), Z-Wave, LoRa, etc.

Figure 3A:
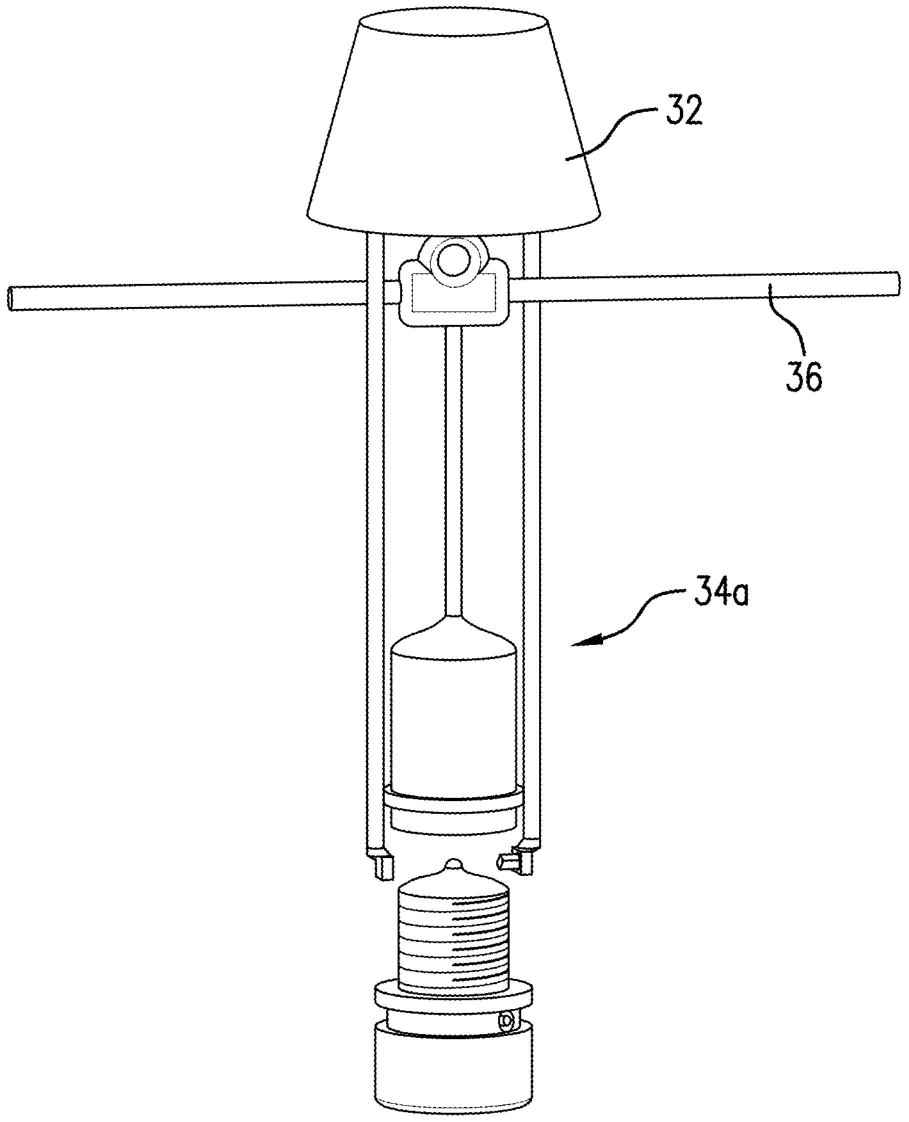
FIGS. 3A-3C are perspective views of a speaker configured to couple to the light element adapter shown in FIG. 2B.
Figure 3B:
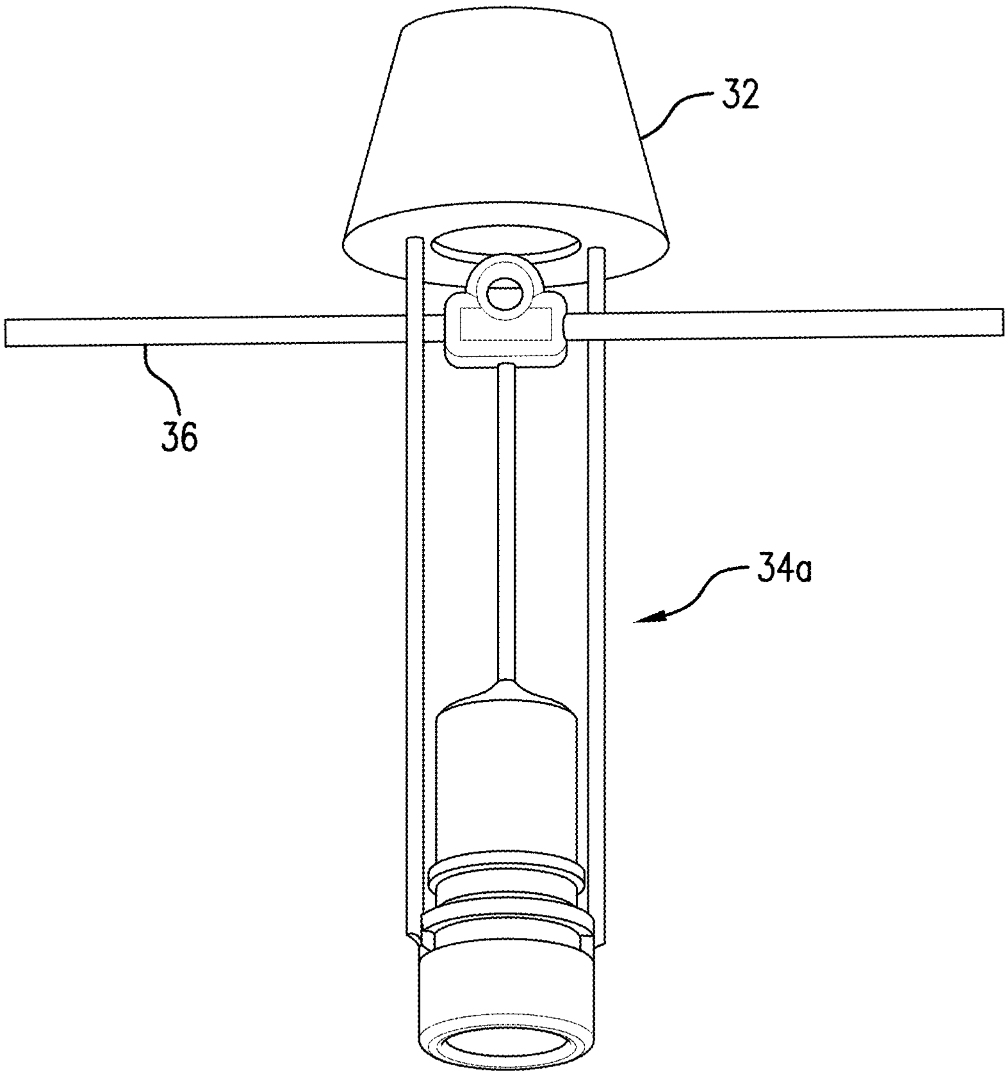
Figure 3C:
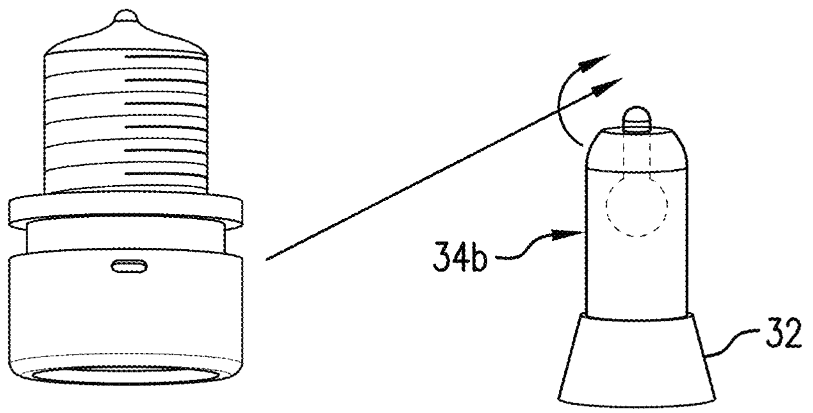

In some embodiments, light element adaptors 10*a*, 10*b*, and/or 10*c* can include an controller for configuring the lighting element adaptor in response to commands received by the receiver. The adaptor controller can be configured, for example, to perform the operations indicated by the signals received by the receiver FIGS. 3A-3C are perspective views of a speaker configured to couple to the light element adapter shown in FIG. 2B. In FIGS. 3A-3C, Speaker 32 is coupled to lighting element adaptor 10*b* via connecting mechanism (either connecting mechanism 34*a* or 34*b*). Connecting mechanisms 34*a* and 34*b* can be configured to provide both mechanical connection of speaker 32 to lighting element adaptor 10*b* and electrical connection of Speaker 32 to DC-power connector 22 of lighting element adaptor 10*b*. In the depicted embodiment, lighting element adaptor 10*b* is coupled to café lighting string 36. In the embodiments depicted in FIGS. 3A and 3B, connecting mechanism 34*a* is configured to position speaker 32 above café light string 36, thereby not obscuring light emitted by a lighting element received within female AC-power connector 14 of lighting element adaptor 10*b*. In the embodiment depicted in FIG. 3C, connecting mechanism 34*b* is configured to position speaker 32 below café light string 36 thereby partially obscuring light emitted by a lighting element received within female AC-power connector 14 of lighting element adaptor 10*b*. In both embodiments, sound can be emitted in downward direction and/or in 360° radial directions about speaker 32. Such directions for emitting sound can be most efficacious for listeners who sit below café light string 36.

Figure 2A:
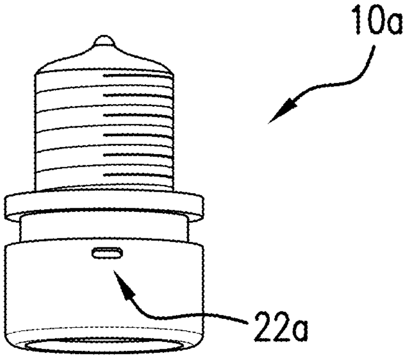
FIGS. 2A-2D are perspective views of various embodiments of a light element adaptor.
Figure 2B:
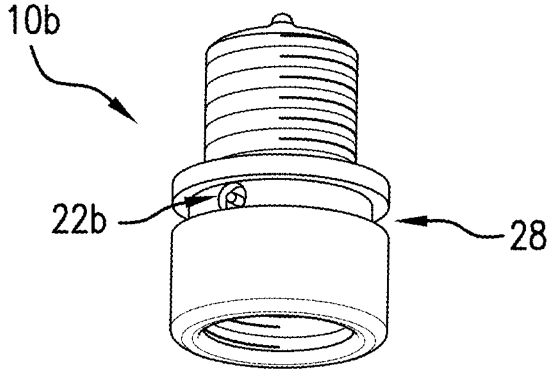
Figure 2C:
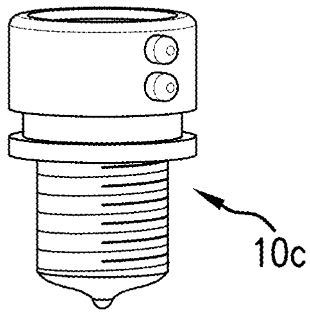
Figure 2D:
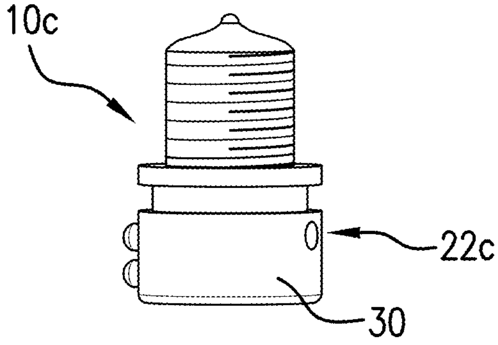
Figure 4:
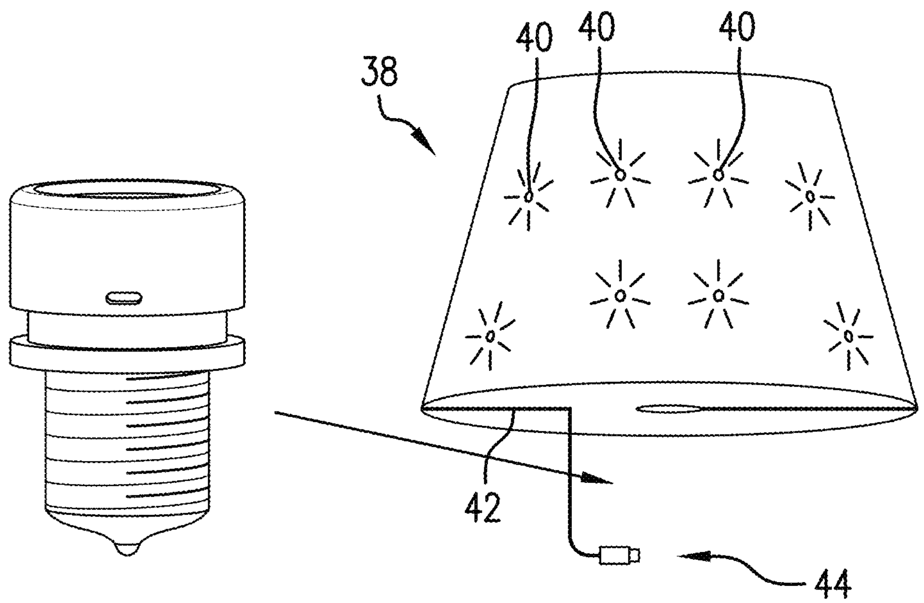
FIG. 4 is a perspective view of an LED-illuminated lamp shade configured to receive DC operating power from the light element adaptors shown in FIG. 2A.

FIG. 4 is a perspective view of an LED-illuminated lamp shade configured to receive DC operating power from the light element adaptors shown in FIG. 2A. In FIG. 4, illuminating rain guard 38 includes LEDs 40, wireframe 42, and power connector 44. LEDs 40 are affixed at various locations upon illuminated rain guard 38. LEDs 40 can be made to form various designs or in the various shapes of objects. Operating power for LEDs 40 is supplied by DC-power connector 22 of lighting element adaptor 10*a*, via power connector 44, which can be connected thereto. Wireframe 42 can be configured to mechanically couple with either a base of a lamp and/or with lighting element adaptor 10*a*.

Figure 5:
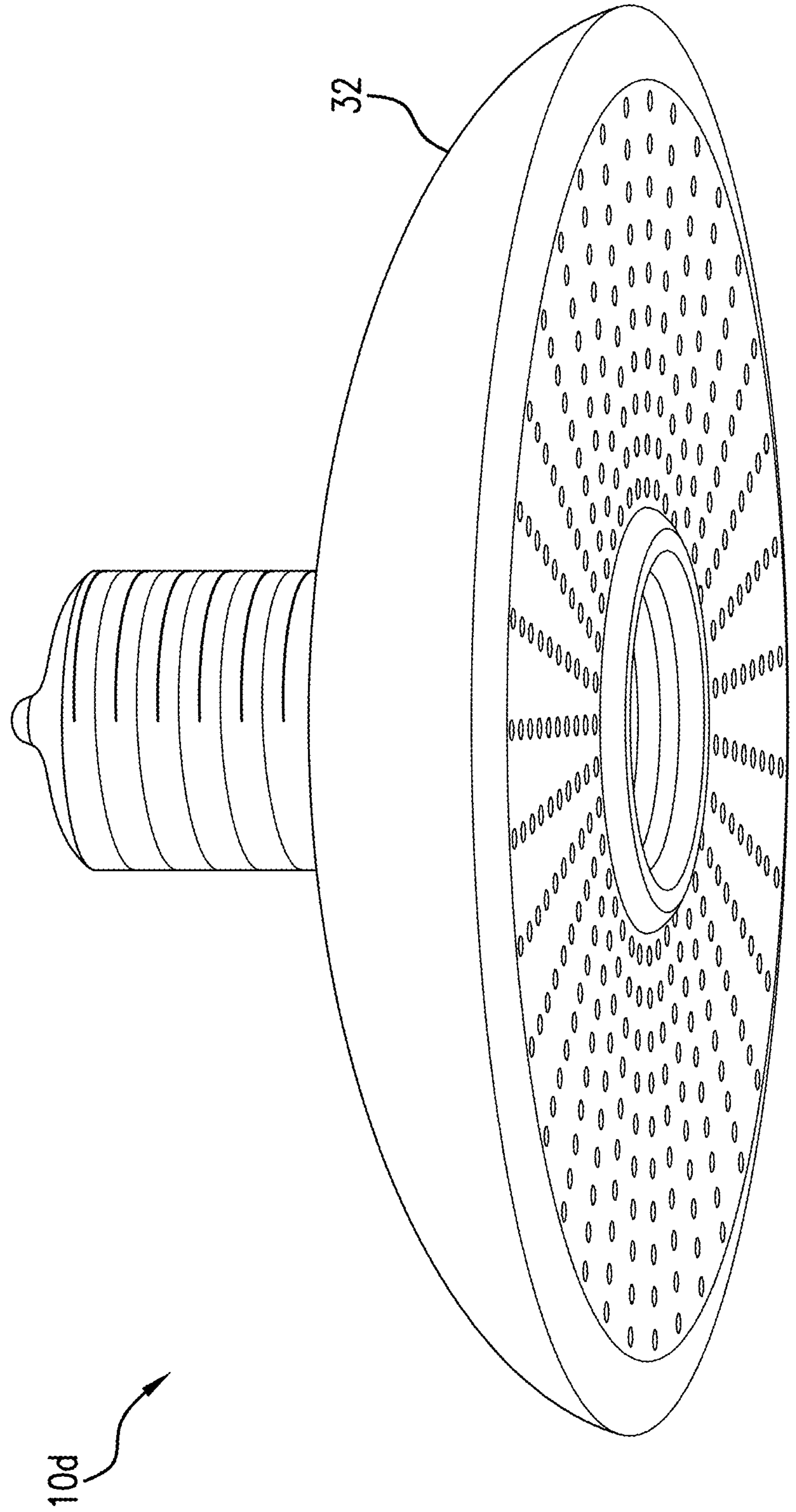
FIG. 5 is a perspective view of a speaker integrated with a lighting element adaptor.

FIG. 5 is a perspective view of a speaker integrated with a lighting element adaptor. In FIG. 5, integrated lighting element adaptor/speaker 10*d* is a unitary body that is configured to be interposed between a lighting element and a lighting socket while providing audio capabilities via speaker 32. Speaker 32 is configured to receive DC operating power from an AC/DC-power converter located within lighting element adaptor/speaker 10*d*. Lighting element adaptor 10*d* can include a receiver, which is configured to receive audio signals transmitted by a transmitter. Speaker 32 is configured to generate sound based on the signal received by the receiver. In some embodiments, lighting element adaptor 10*d* can be configured as a node of a mesh network. Lighting element adapter 10*d* can include a transceiver that can transmit messages over the mesh network, for example. Such a mesh network can be used to coordinate a plurality of speakers. Such coordination can ensure that the plurality of speakers is synchronized so as to play the same music at the same time.

Figure 6A:
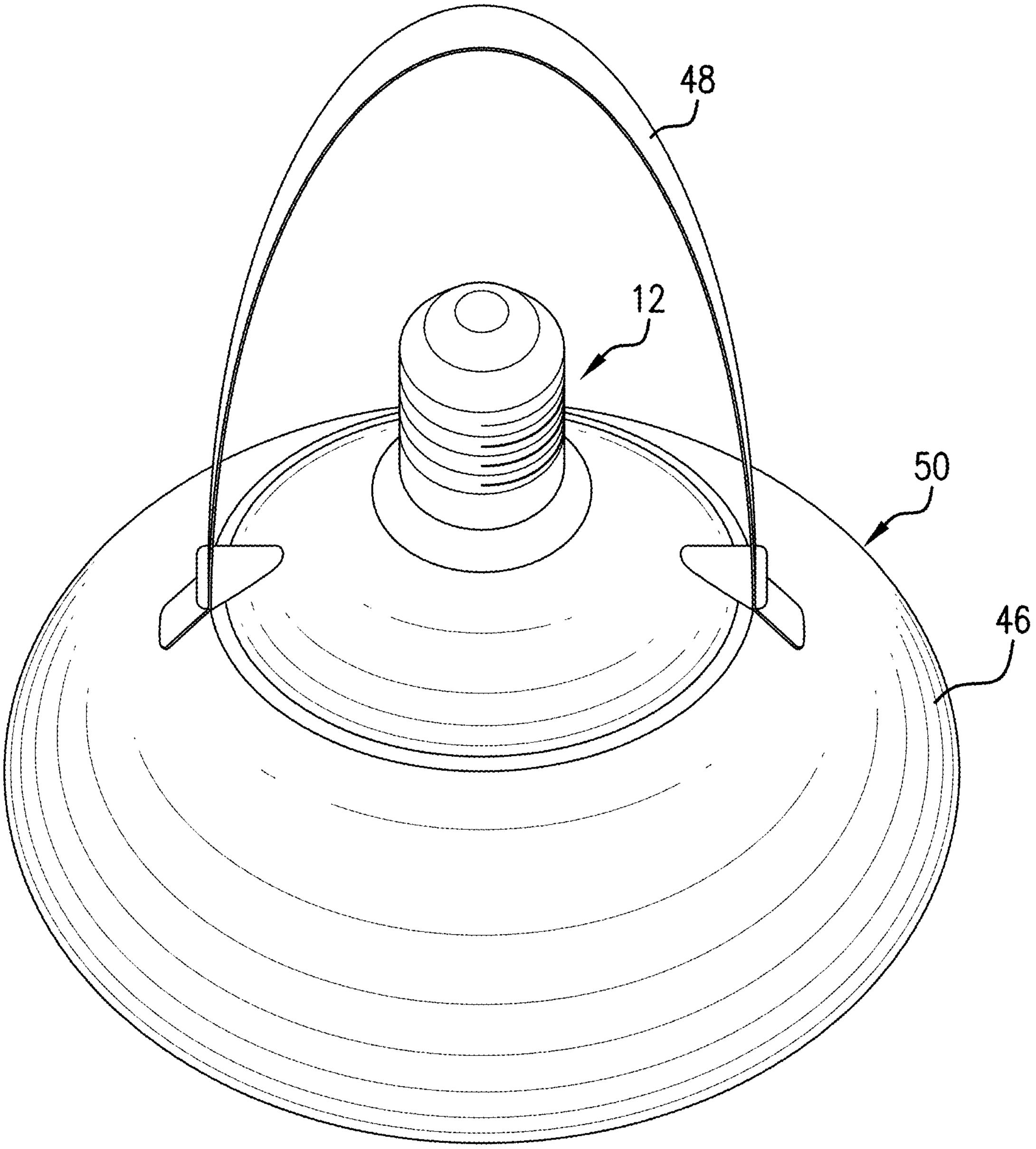
FIGS. 6A-6C are a perspective view, a bottom view, and a cross-sectional view of an embodiment of a light element adapter with a rain guard.
Figure 6B:
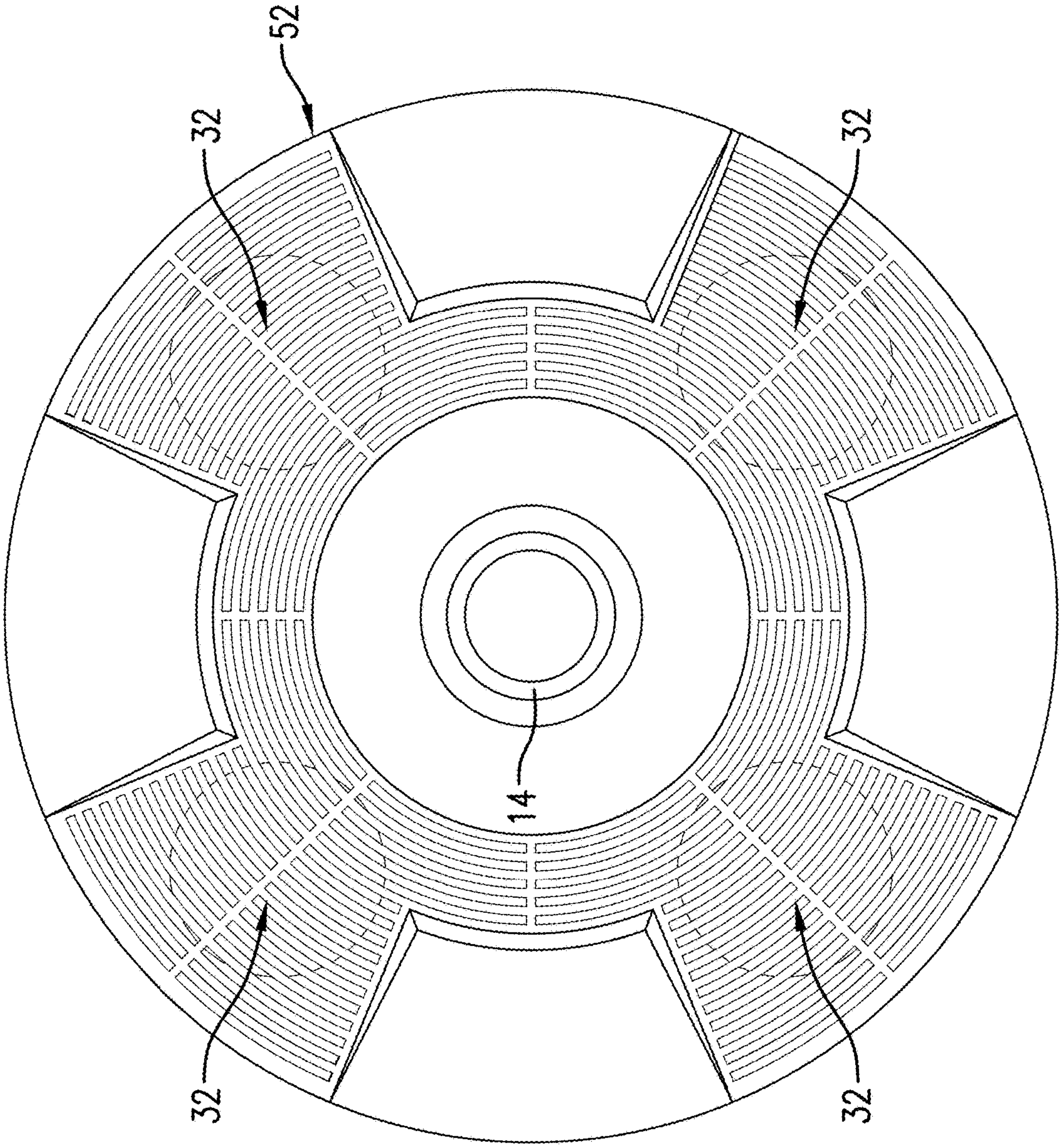
Figure 6C:
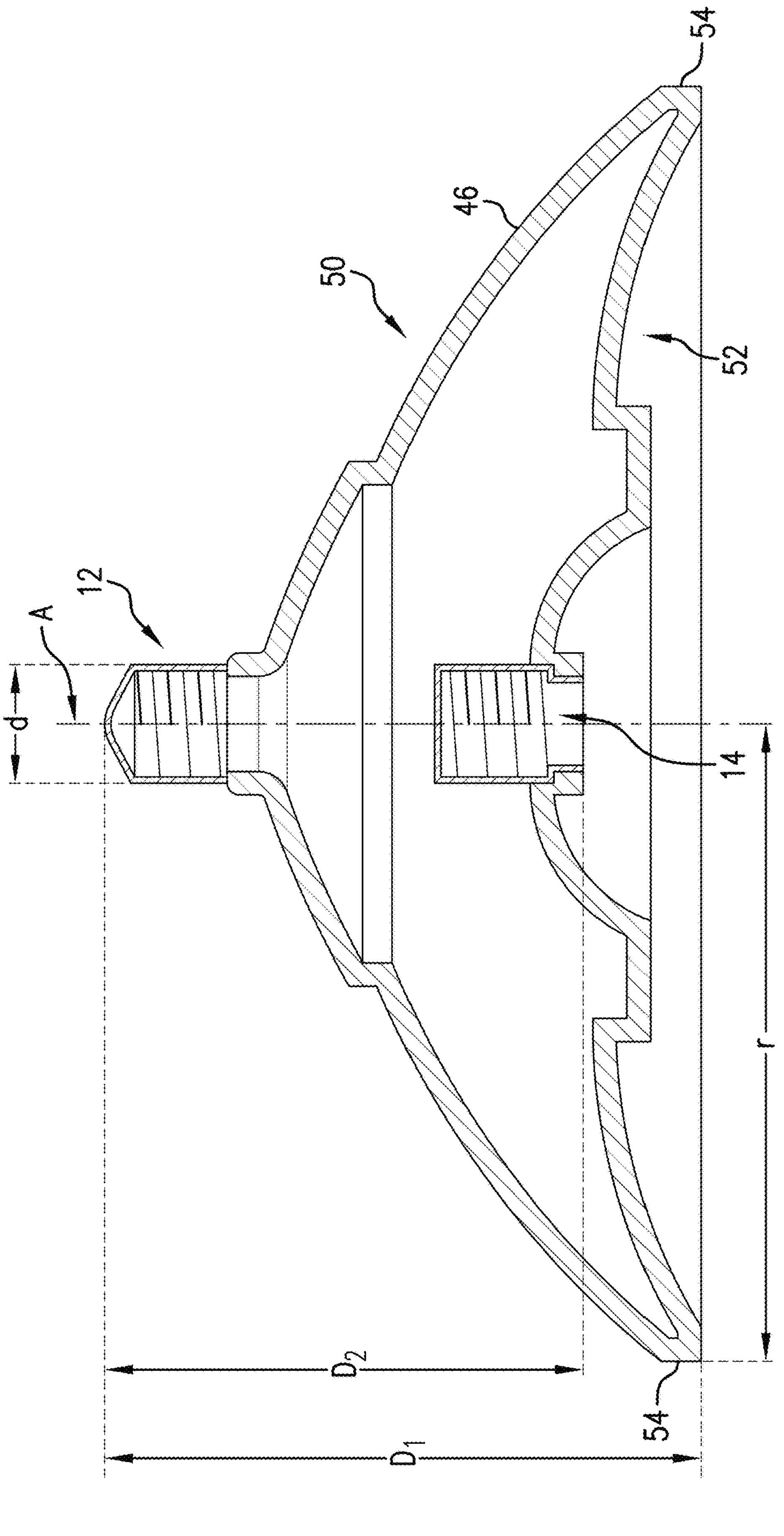

FIGS. 6A-6C are a perspective view, a bottom view, and a cross-sectional view of an embodiment of a light element adapter with speakers built into a rain guard. In FIGS. 6A-6C, light element adaptor 10*e* includes male AC-power connector 12, female AC-power connector 14, speakers 32, rain guard 46, and safety tether 48. Rain guard 46 has top and bottom surfaces, 50 and 52, that are shaped to provide rain protection to speakers 32 and female AC-power connector 14. Rain guard 46 projects radially outward from axis A of complementary male and female AC-power connectors 12 and 14, with male AC-power connector 12 projecting from top surface 50 of rain guard 46 and female AC-power connector 14 located in bottom surface 52 of rain guard 46. In the depicted embodiment, female AC-power connector 14 is recessed into bottom surface 52. Rain guard 46 has peripheral drip edge 54 that circumscribes female AC-power connector 14, thereby providing rain protection thereto. In some embodiments, peripheral drip edge extends below female AC-power connector 14, as it does in the depicted embodiment. In such embodiments, a first axial distance $d_1$, as measured from a top of male AC-power connector 12 to a bottom of peripheral drip edge 54, is greater than a second axial distance $d_2$, as measured from the top of male AC-power connector 12 to a bottom of female AC-power connector 14.

Speakers 32 are located within rain guard 46 and are configured to provide sound through openings in bottom surface 50. Speakers can be powered by an AC/DC power converter configured to generate DC power from the AC power received by the male AC-power connector. A Top surface 50 has a downward slope in radial directions from locations adjacent to male AC-power connector 12 to peripheral drip edge 54 of rain guard 46. In some embodiments, peripheral drip edge 54 of rain guard 46 has a projecting annulus that projects downward from bottom surface 52. Such a downward radial slope directs water away from axis A, thereby providing rain protection for speakers 32 and a lighting element connected to female AC-power connector 14. Although speakers 32 are depicted in FIG. 6B, speakers might not be provided at all lighting locations at a venue, yet rain protection might still be desirable for all lighting locations. To address this need, some embodiments do not have speakers 32 within rain guard 46. Such speaker-less lighting adapters maintain a uniform appearance throughout the venue, without incurring any additional costs for speakers. Rain guard 46 has a minimum radial distance r from the axis to the drip edges being greater than 4, 6, 8, 10, or more times a diameter d of male AC-power connector 12 (and/or of female AC-power connector 14). Such dimensions ensure that any lighting element connected to female AC-power connector 14 is well protected from rain, even from a blowing rain. Moreover, the downward slope in radial directions of top surface 50 facilitates rotation of lighting element adaptor 10 in response to blowing rains, thereby providing additional protection of any lighting elements connected to female AC-power connector 14.

Safety tether 48 is configured to be secured about an overhead power cable, such as those used in café lighting strings. When secured to such an overhead power cable, the lighting element adapter can hang from safety tether 48 in response to male AC-power connector 12 disengaging from the overhead lighting socket. Moreover, by supporting lighting element adaptor 10 by safety tether 48, stress can be reduced for male AC-power connector 12, as such a connector need not provide mechanical support. In the depicted embodiment, safety tether 48 has two ends configured to couple to two opposite sides of rain guard 46 of lighting element adaptor 10.

Figure 7A:
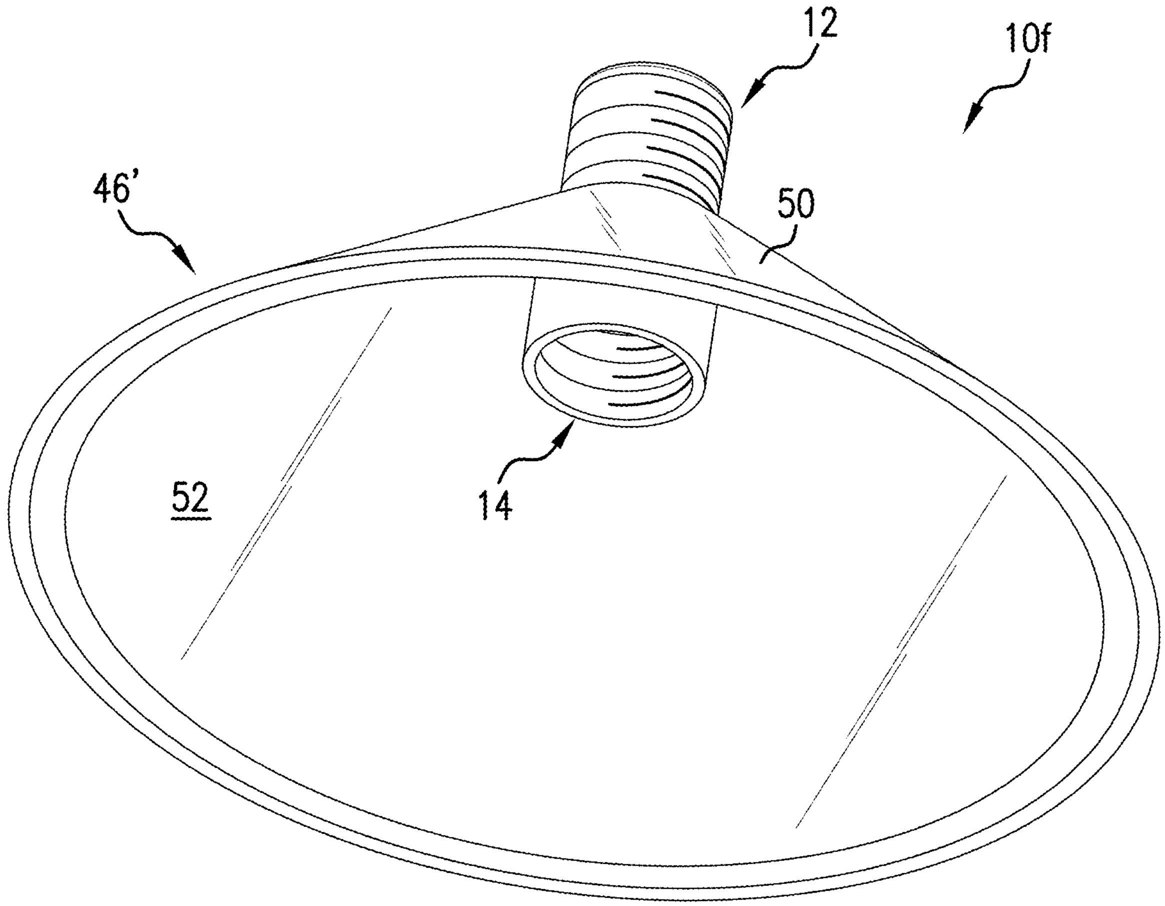
FIG. 7A-7C are a perspective view, a side view, and a cross-sectional view of an embodiment of a light element adapter with an illuminated rain guard.
Figure 7B:
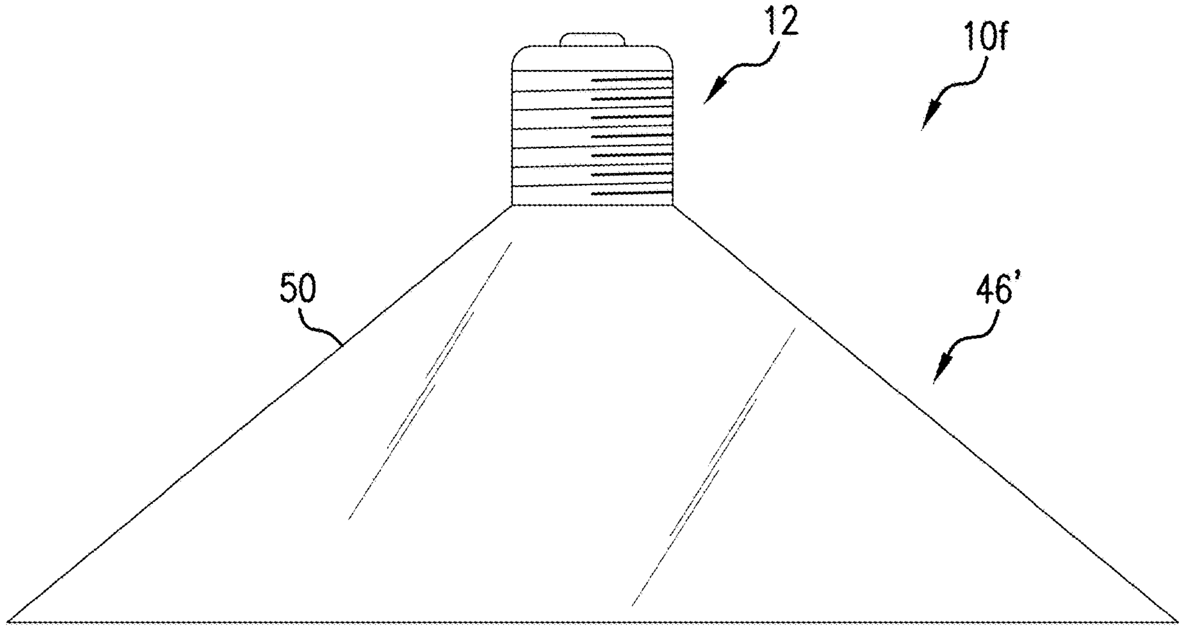
Figure 7C:
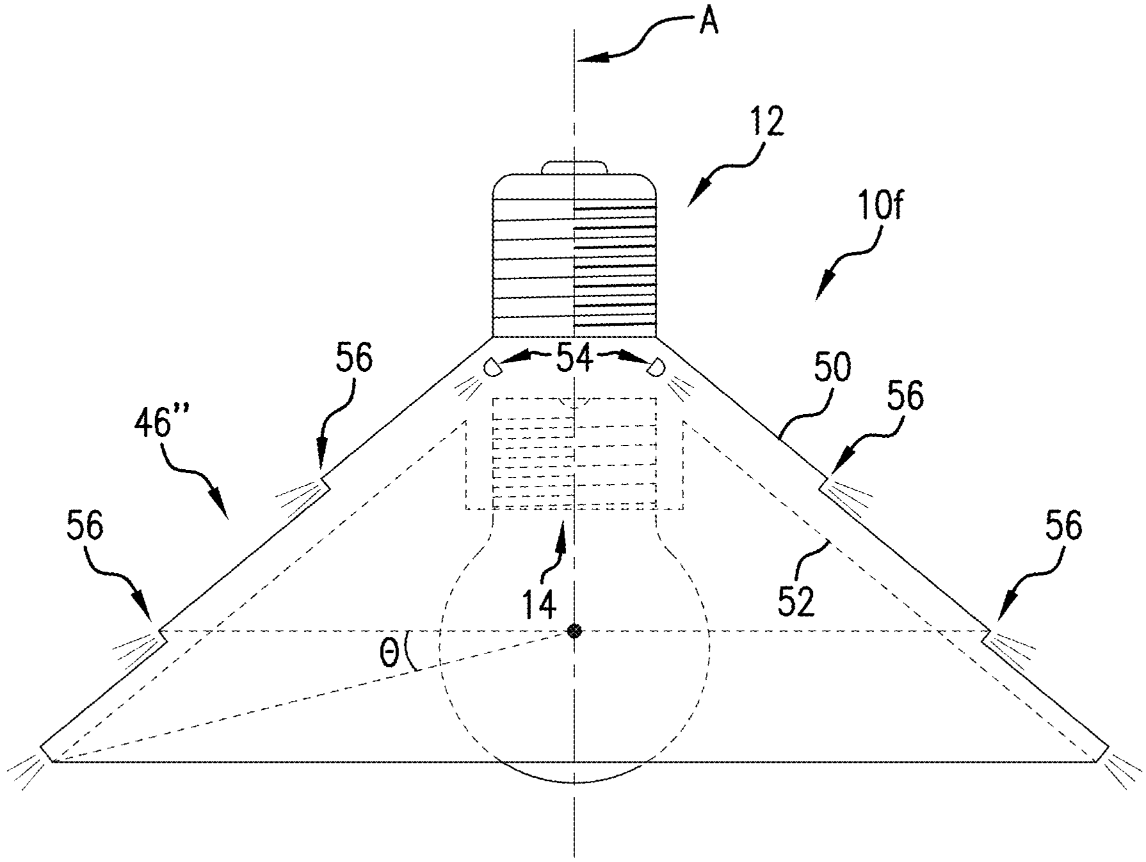

FIGS. 7A-7C are a perspective view, a side view, and a cross-sectional view of an embodiment of a light element adapter with an illuminated rain guard. In FIGS. 7A-7C, light element adaptor **10*f* includes male AC-power connector 12, female AC-power connector 14, and rain guard 46' (which can also serve as a light shade for directional lighting), and LEDs 54. Rain guard 46' has top and bottom surfaces, 50 and 52, that are shaped to provide rain protection to female AC-power connector 14. Rain guard 46' projects radially outward from axis A of complementary male and female AC-power connectors 12 and 14, with male AC-power connector 12 projecting from top surface 50 of rain guard 46' and female AC-power connector 14 accessible from an underside of rain guard 46'. Rain guard 46' is designed to be illuminated. As such, rain guard 46' includes transparent and/or translucent materials. For example, the body or structure of rain guard 46' can be substantially transparent (i.e., have a coefficient of transmission greater than 90% or a coefficient of absorption of less than 10%). Rain guard 46' can be illuminated by various sources of light. For example, top surface 50 of rain guard 46'** can be coated and/or treated to facilitate capture of sunlight.

LEDs 54 can also be used to illuminate rain guard 46'. LEDs 54 can be uniformly distributed about axis A so as to illuminate rain guard 46' in a plurality of radial directions about axis A. In the depicted embodiment, LEDs 54 transmit light into rain guard 46' near a location where rain guard 46' connected to male connector 12. Rain guard 46' acts as a light pipe for light transmitted thereto. Top surface 50 and/or bottom surface 52 can be coated and/or treated so as to facilitate light scattering from top surface 50 and/or bottom surface 52. Rain guard 46' can be configured to transmit some, if not most, of the light transmitted within rain guard 46' to a peripheral face, from which it can be emitted. In the depicted embodiment such a face of emission is a circular peripheral face. In other embodiments, top surface 50 and or bottom surface 52 can surface discontinuities from which the light transmitted within rain guard 46' can escape.

In FIG. 7C, a cross-section of such a rain guard 46" having top-surface discontinuities is depicted. Rain guard 46" includes top-surface discontinuities 56, from which light provided by LEDs 54 (or provided from sunlight capture) escapes from rain guard 46". Although depicted only in top surface 50, such surface continuities 56 can be formed in bottom surface 52 or in both top and bottom surfaces 50 and 52. Such surface discontinuities 56 can be formed into design patterns and/or words, for example. Such surface discontinuities 56 can be used for decorative purposes, for advertising, and/or for other purposes. Although light element adaptor **10*f* is depicted without speakers, rain guard 46"** can be used in combinations with speakers as well.

Figure 8:
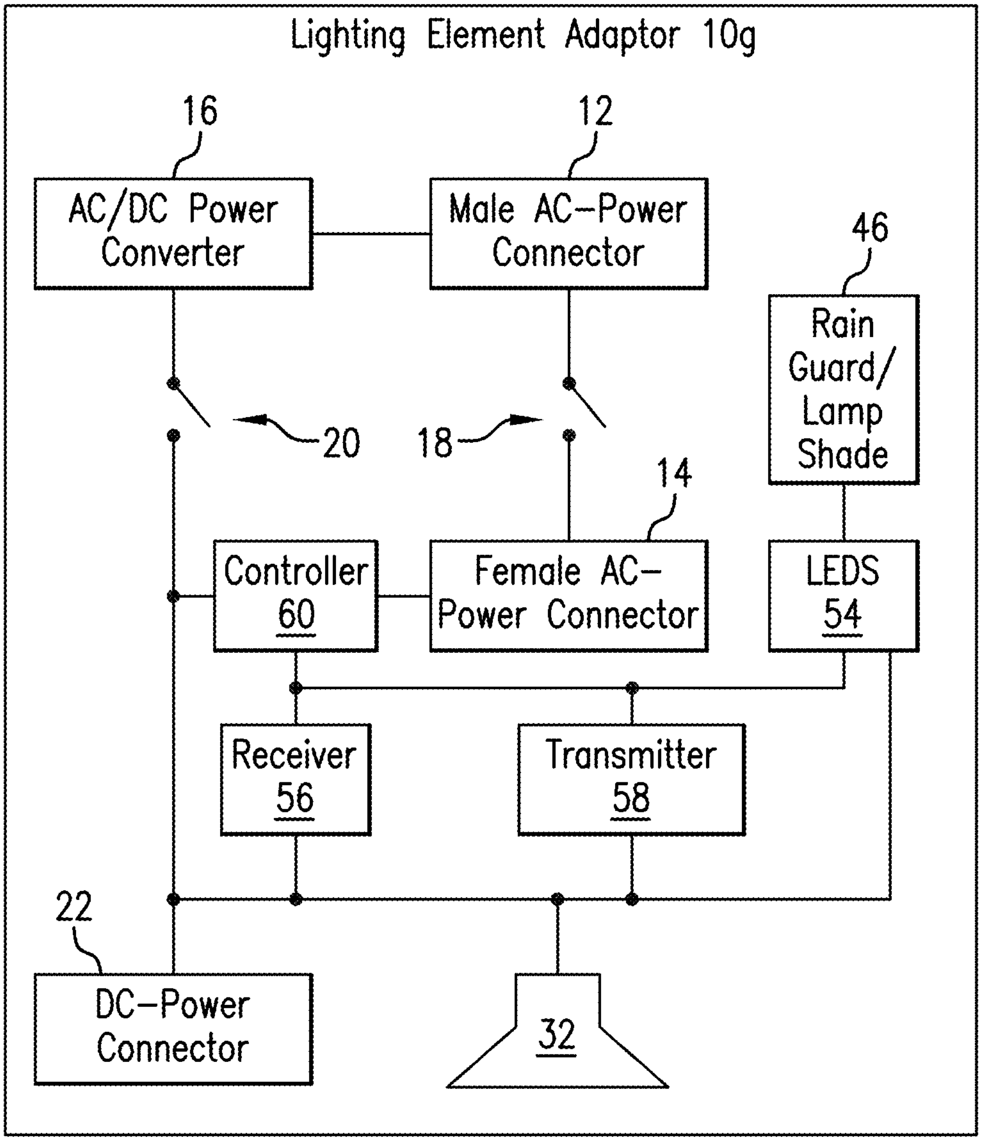
FIG. 8 is a block diagram of a lighting element adaptor with a receiver and a controller.

FIG. 8 is a block diagram of a lighting element adaptor with a receiver and a controller. In FIG. 8, lighting element adaptor **10*g* includes male AC-power connector 12, female AC-power connector 14, AC/DC power converter 16, AC power switch 18, DC power switch 20, ad DC-power connector 22, speaker 32, rain guard and/or lamp shade 46, LEDs 54, receiver 56, and transmitter 58, and controller 60. Controller 60 can be configured to perform operations pertaining to lighting element adaptor 10*g***.

To perform functions pertaining to lighting element **10*g*, controller 60 can receive signals received by receiver 56 and respond to such signals. Such signals can include command signals and audio data signals. In response to receiving a command signal, controller 60 configures lighting element adaptor in way indicated by the command signal, For example, command signals can indicate: i) a volume level for audio emitted from speaker 32; ii) a specific audio to be directed to the speaker, the specific audio channel being one a plurality of audio channels broadcast to lighting element adaptor 10*g*; iii) an intensity of illumination for the lighting element received in female AC-power connector 14; iv) a color of illumination for the lighting element received in female AC-power connector 14; v) a timing sequence of intensities and colors of illumination for the lighting element received in female AC-power connector 14; vi) an intensity of illumination for the LEDs illuminating the rain guard or lamp shade 46; vii) color of illumination for the LEDs illuminating the rain guard or lamp shade 46; and/or viii) a timing sequence of intensities and colors of illumination for the LEDs illuminating the rain guard or lamp shade 46**.

Examples of controller 60 can include any one or more of a microprocessor, a controller, a digital signal processor (DSP), an application specific integrated circuit (ASIC), a field-programmable gate array (FPGA), or other equivalent discrete or integrated logic circuitry.

Controller 60 can also be configured to transmit signals to other lighting element adaptors so that such other lighting element adaptors can also receive command signals and audio data signals. Transmitter 58 can be configured to facilitate such transmission of signals to other lighting element adaptors. A plurality of lighting element adaptors can be configured in a wireless mesh network, for example.

Each of AC power switch 18 and DC power switch 20 can be a mechanical switch operable by a person, or an electrically operated switch under control of controller 60. In other embodiments, AC and/or DC power is unswitched, being continually provided in response to receiving AC power at male AC-power connector 12.

Rain guard and/or lamp shade 46 can be configured as a lampshade and/or as a rain guard. As a rain guard, rain guard and/or lamp shade 46 is configured to provide rain protection for female AC-power connector 14. Such protection can be provided by providing a drip edge that circumscribes female AC-power connector 14 while maintaining a sufficient separation distance therefrom. Moreover, rain protection can be also improved by configuring the drip edge to descend below female AC-power connector 14. Male AC-power connector 12 can also be protected from rain by providing a gasket or gromet that circumscribes male AC-power connector 12. Such a gasket or gromet can be configured to engage both a lower outside diameter of male AC-power connector (or a top surface of rain guard and/or lamp shade 46) and an inside cylindrical surface of the female AC-power connector to which AC male-power connector engages. A rubber O-ring can be used as such a gasket or gromet.

As a lamp shade, rain guard and/or lamp shade 46 is configured to control lighting direction and/or intensity as a function of lighting direction. Lamp shade 46 controls such lighting direction by blocking or diffusing light that is directed thereto from the lighting element received in female AC-power connector 14. Such directing of lighting can be characterized by an angle of depression, above which light emitted from the lighting element received in female AC-power connector 14 is incident upon lamp shade 46. Such an angle of depression can be defined as an angle of depression of a ray beginning on axis A and an axial position located at the center of light emission of the lighting element received in female AC-power connector 14. The ray then extend radially outward from axis A to lower circumferential edge 54 of lamp shade 46 (which can also be called drip edge 54 of rain guard 46). Such an angle of depression is shown on FIG. 7C.

It will be recognized that the disclosure is not limited to the implementations so described but can be practiced with modification and alteration without departing from the scope of the appended claims. For example, the above implementations may include specific combinations of features. However, the above implementations are not limited in this regard, and, in various implementations, the above implementations may include the undertaking only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

The invention claimed is:

1. A lighting element adaptor comprising:

complementary male and female AC-power connectors axially aligned with one another along an axis, the male AC-power connector configured to engage an overhead lighting socket so as to receive AC power therefrom and to hang therefrom, the female AC-power connector conductively coupled with the male AC-power connector of a lighting so as to receive AC power therefrom, the female AC-power connector configured to receive a lighting element and to provide thereto the AC power received from the male AC-power connector; and a rain guard projecting radially outward from the axis of the complementary male and female AC-power connectors with the male AC-power connector projecting from a top surface of the rain guard and the female AC-power connector accessible from an underside of the rain guard, the rain guard having a peripheral drip edge that circumscribes the axis, thereby providing rain protection to the female AC-power connector, a minimum radial distance from the axis to the drip edges being greater than two times a diameter of the male AC-power connector.

2. The lighting element adaptor of claim 1, wherein peripheral drip edge extends below the female AC-power connector in response to gravity operating on the lighting element adaptor hanging from the overhead lighting socket of by the male AC-power connector.

3. The lighting element adaptor of claim 2, wherein a first axial distance, as measured from a top of the male AC-power connector to a bottom of the peripheral drip edge, is greater than a second axial distance, as measured from a top of the male AC-power connector to a bottom of the female AC-power connector.

4. The lighting element adaptor of claim 1, wherein the top surface of the rain guard has a downward slope from locations adjacent to the male AC-power connector to the peripheral drip edge of the rain guard, as measured in axial directions as a function of increasing radial directions from the axis.

5. The lighting element adaptor of claim 1, wherein each of the male and female connectors are E-type threaded lighting connectors, the male AC-power connector having a hot contact at an end of a substantially cylindrical contacting base and a threaded neutral contact about an exterior surface of the substantially cylindrical contacting base, the female AC-power connector having a hot contact as a bottom center of a substantially cylindrical receiving socket and a threaded neutral contact about an interior surface of the substantially cylindrical receiving socket.

6. The lighting element adaptor of claim 5, wherein the complementary male and female AC-power connectors are E26-sized or E27-sized E-type threaded lighting connectors.

7. The lighting element adaptor of claim 1, further comprising:

a safety tether configured be secured about a hanging lighting string which supports the overhead lighting socket, such that the lighting element adapter would hang from the safety tether in response to the male AC-power connector disengaging from the overhead lighting socket.

8. The lighting element adaptor of claim 7, wherein the safety tether has two ends configured to couple to two radially opposite sides of the rain guard of the lighting element adaptor.

9. The lighting element adaptor of claim 1, wherein the rain guard comprises transparent and/or translucent material.

10. The lighting element of claim 9, wherein the rain guard has a semi-transparent coating over a transparent structure.

11. The lighting element adaptor of claim 9, further comprising:

a plurality of Light Emitting Diodes (LEDs) directing light into the transparent and/or translucent material of the rain guard, thereby illuminating the transparent and/or translucent material.

12. The lighting element adaptor of claim 11, wherein the plurality of LEDs are uniformly distributed about the axis so as to illuminate the transparent and/or translucent material in a plurality of radial directions about the axis.

13. The lighting element adaptor of claim 11, wherein the rain guard includes patterns of surface discontinuities from which light provided by the plurality of LEDs escapes from the rain guard.

14. The lighting element adaptor of claim 1, further comprising:

an AC/DC power converter configured to generate DC power from the AC power received by the male AC-power connector and to provide the DC power generated to a DC-powered device coupled thereto; and a speaker configured to receive DC operating power from the AC/DC-power converter, the speaker configured to direct sound downward from a bottom of the rain guard.

15. The lighting element adaptor of claim 14, further comprising:

a receiver configured to receive signals that configure the lighting element adaptor.

16. The lighting element adaptor of claim 15, wherein the receiver is configured to receive audio signals multiplexed with the AC power received from the overhead light socket.

17. The lighting element adaptor of claim 15, wherein the receiver is configured to wirelessly receive audio signals.

18. The lighting element adaptor of claim 15, wherein the receiver is configured to receive optical signals.

19. The lighting element adaptor of claim 15, wherein the receiver is configured to receive electromagnetic wave signals.

20. The lighting element adaptor of claim 15, wherein the receiver is configured to wirelessly receive signals according to a Bluetooth protocol.

21. The lighting element adaptor of claim 15, wherein the receiver is configured to wirelessly receive signals according to a Wi-Fi protocol.

22. The lighting element adaptor of claim 15, wherein the receiver is configured to wirelessly receive commands that configure the lighting element adaptor.

23. The lighting element adaptor of claim 22, further comprising:

an adaptor controller for configuring the lighting element adaptor in response to commands received by the wireless receiver.

24. The lighting element adaptor of claim 23, wherein the adaptor controller can control a brightness of illumination provided by the lighting element received.

25. The lighting element adaptor of claim 23, wherein the adaptor controller can control a color of illumination provided by the lighting element received.

26. The lighting element adaptor of claim 23, wherein the adaptor controller can control a brightness of illumination provided by the plurality of LEDs illuminating the transparent and/or translucent material of the rain guard.

27. The lighting element adaptor of claim 23, wherein the adaptor controller can control an amplification of the sound produced by the speaker.

28. The lighting element adaptor of claim 23, wherein the adaptor controller can control the audio-signal receiver to receive audio signals form a selected one of a plurality of signal channels.

* * * * *